United States Patent [19]

Amelio et al.

[11] Patent Number: 4,966,526

[45] Date of Patent: Oct. 30, 1990

[54] MECHANICALLY ACTUATED SLOT FOR CIRCULATION CONTROL ROTOR

[75] Inventors: Armand F. Amelio, Yonkers, N.Y.; William C. Fischer, Jr., Monroe, Conn.

[73] Assignee: United Technologies Corporation, Hartford, Conn.

[21] Appl. No.: 379,305

[22] Filed: Jul. 13, 1989

[51] Int. Cl.⁵ ............................................. B64C 21/04
[52] U.S. Cl. ............................. 416/90 R; 416/90 A; 416/20 R
[58] Field of Search ............... 416/90 A, 90 R, 20 R, 416/20 A

[56] References Cited

U.S. PATENT DOCUMENTS

| | | | |
|---|---|---|---|
| 3,062,483 | 11/1962 | Davidson | 416/20 R X |
| 3,139,936 | 7/1964 | Davidson et al. | 416/90 A X |
| 3,588,273 | 6/1971 | Kizilos | 416/20 R X |
| 3,713,750 | 1/1973 | Williams | 416/20 R |
| 3,964,838 | 6/1976 | Spargo | 416/90 A X |
| 4,131,390 | 12/1978 | Schmidt | 416/20 R |
| 4,507,050 | 3/1985 | Jeffery et al. | 416/90 A |
| 4,534,702 | 8/1985 | Johnson et al. | 416/20 R |
| 4,555,079 | 11/1985 | Harvell et al. | 416/90 A X |
| 4,626,171 | 12/1986 | Carter et al. | 416/90 A |

FOREIGN PATENT DOCUMENTS

| | | | |
|---|---|---|---|
| 2258306 | 8/1975 | France | 416/20 |
| 654295 | 5/1963 | Italy | 416/90 A |

Primary Examiner—Edward K. Look
Assistant Examiner—Hoang Nguyen
Attorney, Agent, or Firm—Russel M. Lipes, Jr.

[57] ABSTRACT

A circulation control rotor system for aircraft in which compressed air is directly supplied at generally constant pressure to plenums in the rotor blades and discharged through area controlled slots, the area controlling means involving camming surfaces and being actuated by cyclic, collective, aircraft vibration and flight stability inputs.

1 Claim, 6 Drawing Sheets

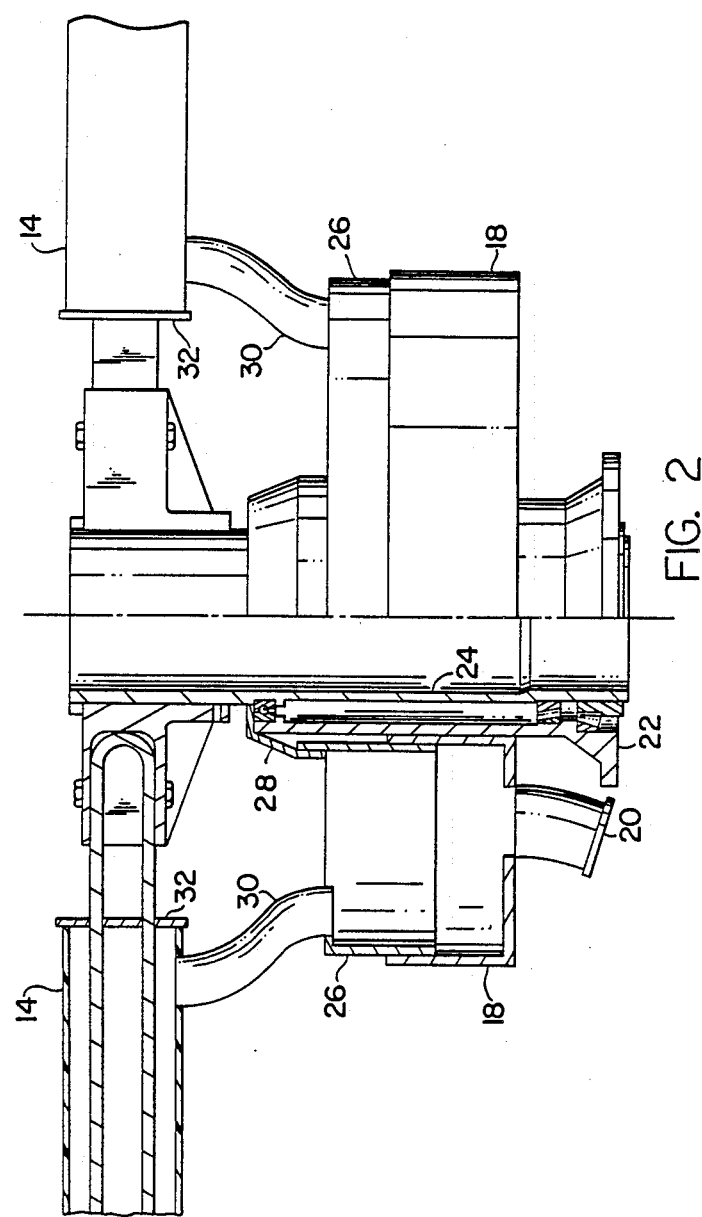

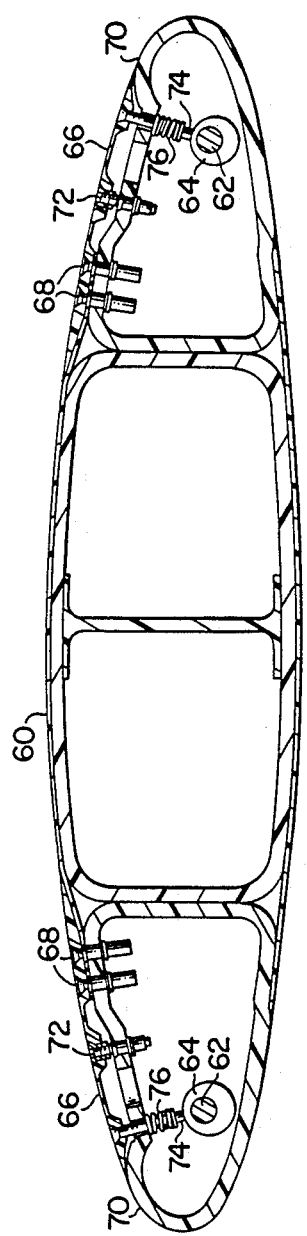
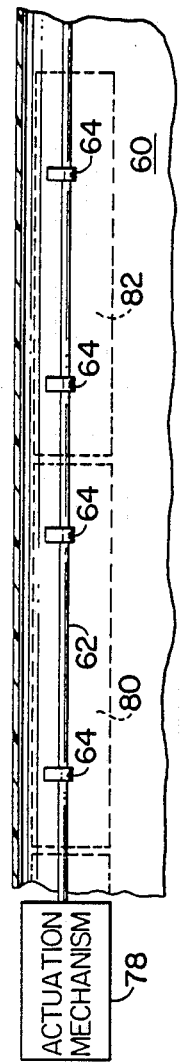
FIG. 4
FIG. 5

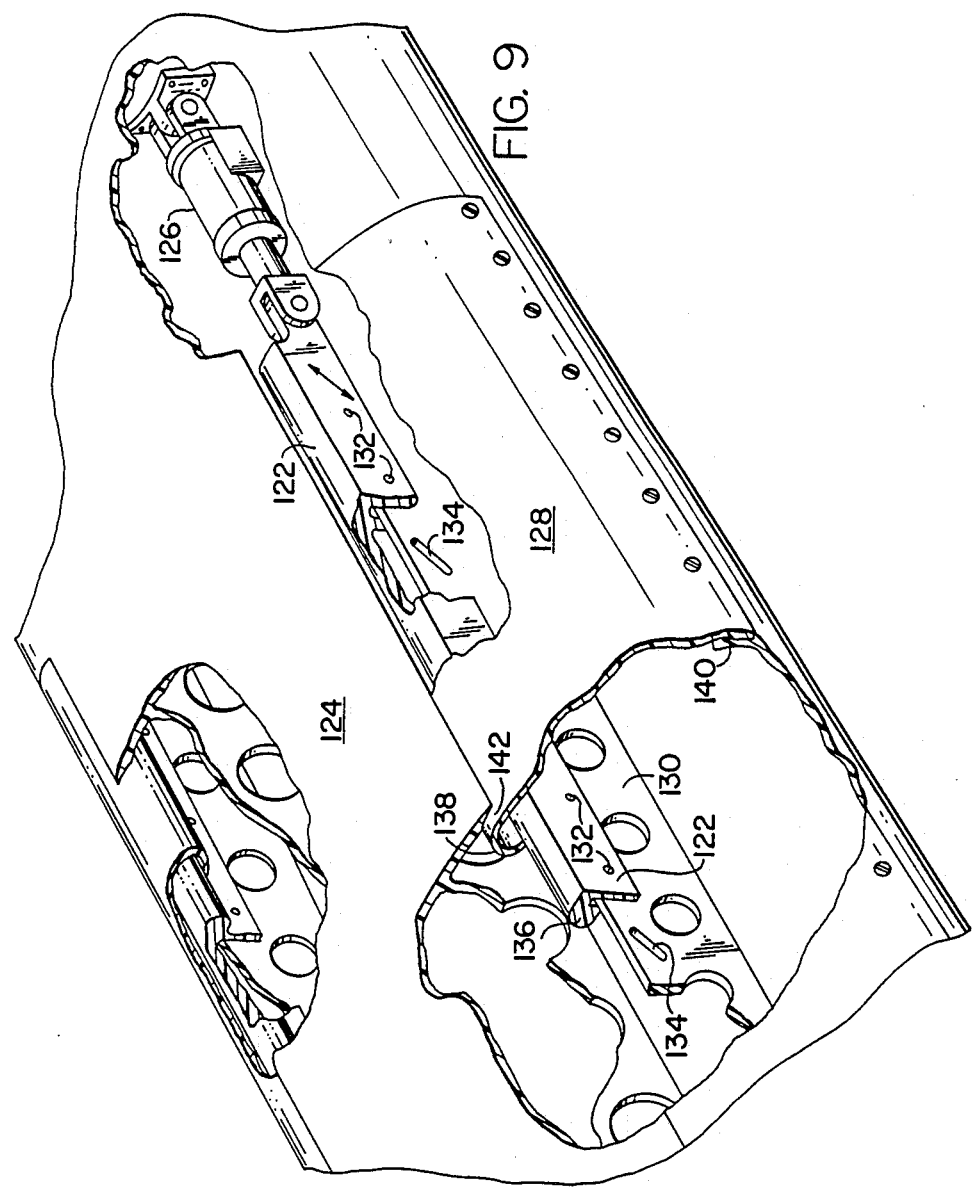

MECHANICALLY ACTUATED SLOT FOR CIRCULATION CONTROL ROTOR

CROSS REFERENCE TO RELATED APPLICATIONS

Cross reference is made herein to commonly-owned U.S. Pat. No. 4,507,050 entitled Pneumatic Valve Control for Circulation Control Aircraft which issued Mar. 26, 1985 and U.S. Pat. No. 4,534,702 entitled Pneumatic Control Valve Actuator Computer Control Arrangement which issued Aug. 13, 1985.

TECHNICAL FIELD

The invention relates to air control mechanism within the rotor blades of a circulation control rotor system such as used on an X-wing type of aircraft.

BACKGROUND ART

An X-wing aircraft is a rotary wing aircraft that uses a rigid rotor/wing utilizing symmetrical circulation control airfoils. The rotor is driven mechanically and the rotor blades operate essentially in fixed cyclic pitch. The rotor may rotate, as in a helicopter, or it may be stopped in a position to act like a fixed wing. Collective and cyclic control is achieved by control of air circulation about the rotor blade airfoils. This is done by blowing compressed air into leading edge and trailing edge ducts in the rotor blades and modulating the amount of pressurized air ejected through spanwise slots on the leading and trailing edges.

The existing rotor system for an X-wing aircraft includes a hub and attached rotor blades and a pneumatic system for delivering air separately to the leading edge and the trailing edge of the individual rotor blades at a desired pressure and mass flow. The pneumatic system includes a compressor, a stationary air supply system for conducting pressurized air to a plenum chamber and the rotor, and a rotating pressurized air distribution arrangement. In present systems, a circular valving device is employed to control the flow of air from the plenum to the duct of the rotating distribution system.

SUMMARY OF THE INVENTION

The valving device controlling air flow distribution to the rotor blades in a circulation control rotor is relatively complex and as a result impacts reliability. In addition, it adds weight to the aircraft. Further, two additional factors dominate the effectiveness of the device; first a smearing or averaging of the airflow to the rotor blades about the azimuth of the device, and, second, a transport lag of the airflow between the valving actuators and the spanwise slot control surfaces.

With respect to the smearing or averaging factor, a receiver duct in the distribution arrangement is in fluid communication with as many as three valving device supply ducts, one full and two partial, at any one increment of time. The optimum airflow control is in the form of a sinusoidal wave, but smearing or averaging results in a wave form only approximating that of a sine wave. As a result, fidelity of replicating a desired waveform is compromised.

With respect to transport lag, the control response of the aircraft is a function of the cyclic and collective lift vector components active on the rotor disc. Inasmuch as these force control vectors are generated by the circulation control slots along the leading and trailing edges of the rotor blade, optimum control may be achieved by instantaneously supplying the desired airflow to the slots. Since air is a compressible fluid and the distribution ducts introduce significant head loss, a transport lag of the air to the slots results, thus degrading control response of the system.

It is an object of this invention, therefore, to provide a circulation control rotor air distribution/control system having improved waveshape fidelity and enhanced control response.

Another object of the invention is the elimination of the valving device in the typical circulation control air bleed control mechanism and the provision of a system, mechanical, hydraulic, or electrical, which instantaneously supplies desired airflow to the circulation control slots in the rotor blades.

Other objects, features and advantages will be apparent from the following description and claims and from the accompanying drawings that illustrate an embodiment of the invention.

BRIEF DESCRIPTION OF THE DRAWINGS

FIG. 2 is a schematic section through the rotor system hub area of the aircraft of FIG. 1 showing the air storage system plenum.

FIG. 4 is a cross-section through a rotor blade of a circulation control aircraft showing cam actuated mechanism for slot control.

FIG. 5 is a partial spanwise showing of the blade of FIG. 4

FIG. 9 is a view of a circulation control rotor blade using an inclined surface for slot control.

BEST MODE FOR CARRYING OUT THE INVENTION

Figure 1:
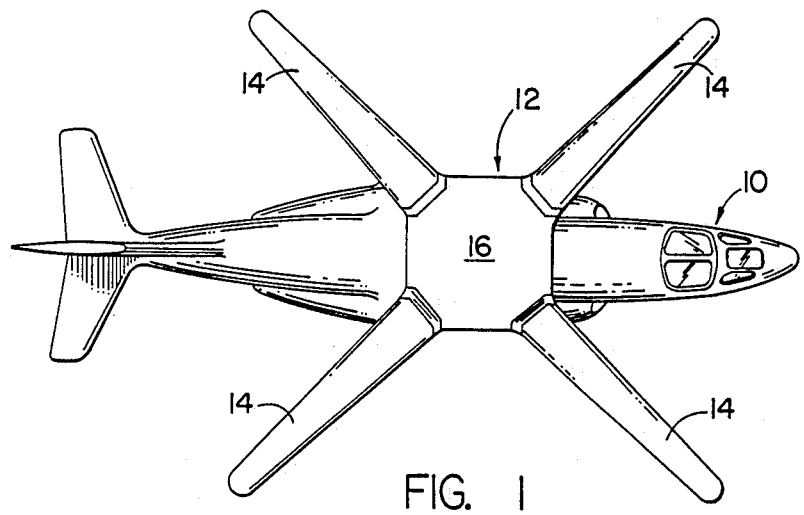
FIG. 1 is a top view of a circulation control aircraft of the X-wing type.

The aircraft of FIG. 1 includes fuselage 10 on top of which is mounted rotor system 12 including four blades 14 and hub portion 16. Blades 14 are circulation control airfoils, each blade having leading edge and trailing edge slots through which compressed air from a pneumatic system supplying air to the blades is ejected. Control is obtained by cyclically and collectively modulating the amount f ejected airflow. In certain flight regimes such as landing and taking off, the rotor system rotates, and in other flight regimes such as forward flight the rotor system is stationary and is stopped or fixed in the position shown.

In the typical circulation control aircraft, the bleed air system includes a compressor supplying pressurized air to a distribution arrangement. As shown in FIG. 2, the arrangement comprises annular chamber 18 having air inlet 20 mounted to fuselage structure 22 of the aircraft and surrounding main rotor drive shaft 24 below the plane of the rotor disc. Rotating annular chamber 26 is mounted on flange 28 and rotates with the rotor drive shaft above the stationary chamber. Receiver ducts 30 deliver pressure air from the rotating chamber to the root ends 32 of rotor blades 14 and into spanwise plenums in the leading and trailing edges of the rotor blades, not shown. In the alternative, the entire blade interior could serve as the blade plenum. Air is bled or discharged from the spanwise plenum through spanwise slots along the leading and trailing edges, passing over a Coanda surface on the blade. In the air distribution system of this invention, a generally constant air pressure is provided at all times within the leading and trailing edge plenums.

Figure 3:
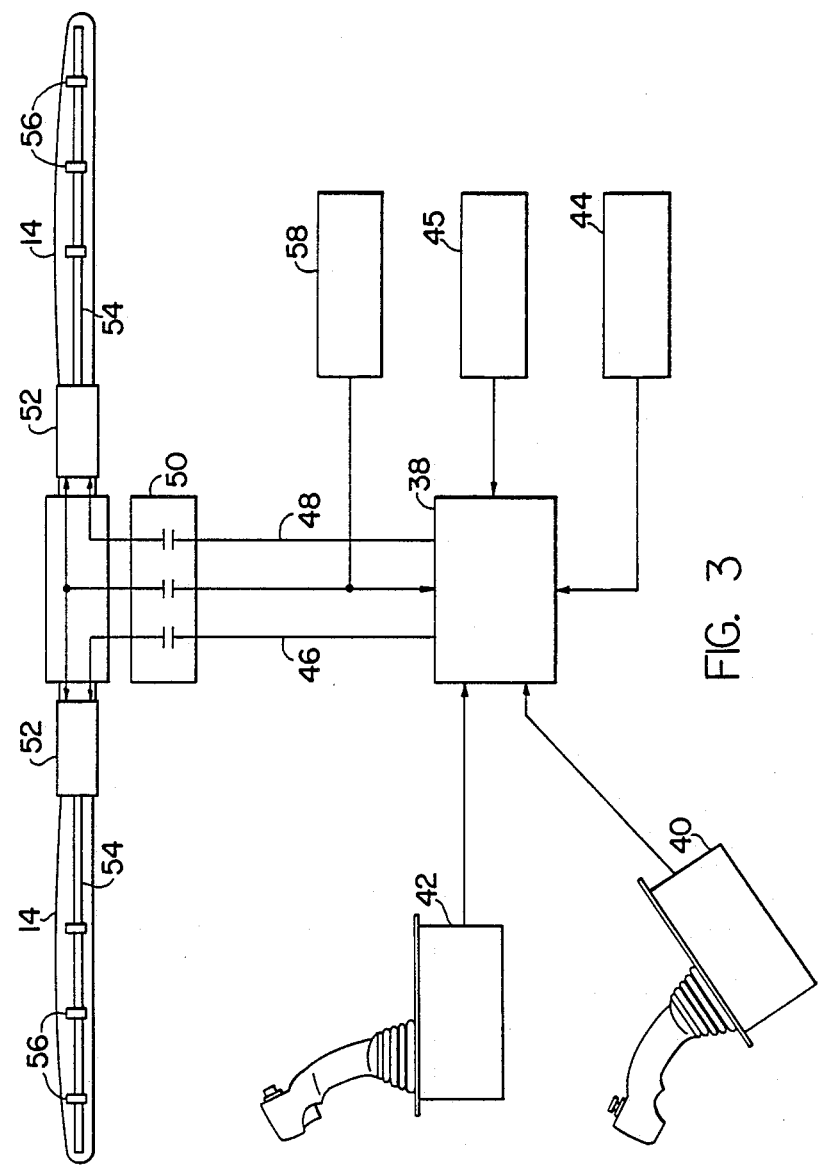
FIG. 3 is a schematic showing of an electrical actuator controlled pneumatic control system for a circulation control aircraft.

FIG. 3 shows schematically an electrical actuator controlled pneumatic control system in accordance with this invention. Flight control computers 38 receive inputs from pilot's collective control 40 and pilot's cyclic control 42, as well as relevant aircraft vibration sensing related inputs from high harmonic control computer 44 as well as any flight stability related inputs 45 such as rate gyros, accelerometers, etc.

Signals from the flight computers are transmitted via actuator commands 46 and 48 and slip ring assembly 50 within the rotor system drive shaft, not shown, to rotary actuators 52 in the root end of blades 14. Each rotary actuator controls the rotational or spanwise position of a shaft-type member such as 54, within and extending the span of each blade and supported within leading and trailing edge plenums of the blade. Each spanwise shaft-type member is constructed so that movement thereof will vary and control bleed area along the leading or trailing edge of the blade. Power for the control system is supplied by aircraft electrical power source 58.

Control of the spanwise shaft-type member could be by a hydraulic actuator rather than the preferred electrical actuator. This would be most practical if the hydraulic power were generated on the rotary system side of the aircraft to avoid the transfer of hydraulic fluid/power across the stationary/rotary interface. Mechanical control of the spanwise shaft-type member could be implemented via a swashplate-like arrangement not unlike present-day rotor controls, but with significantly reduced loads due to controlling only the slots.

In the rotor blade cross-section of FIG. 4, shafts and cams for operating the slots can be seen. Rotor blade 60 has within its leading and trailing edges spanwise extending shaft 62 having a plurality of cams 64, only one of which can be seen on each shaft. The cams vary the position through bending of spanwise extending flexible panels which may be attached to the blade in a manner similar to the construction shown in commonly-owned U.S. Pat. Nos. 4,626,171 and 4,770,607. In the construction shown here, panels 66 are attached to the blade by screws 68 along their inboard edge, and the outboard edge is free to move with respect to Coanda surface 70 with which it forms a variable opening slot. Screw 72 is employed to enable a preload to be established on the panel. Pushrod 74 is in contact at its upper end with the outboard edge of the panel and its other end is in contact with and slides on the surface of cam 64. Returning spring 76 maintains the pushrod in contact with the cam surface. A spanwise portion of blade 60 is shown in FIG. 5. Shaft 62 is attached at the root end of the blade to rotary actuator 78 and has a plurality of cams 64 spaced along its axis. Two flexible panels 80 and 82 for slot control are shown although the length and number of panels is a matter of design choice. Each panel as shown is subject to bending through actuation of the shaft and cams.

Figure 6:
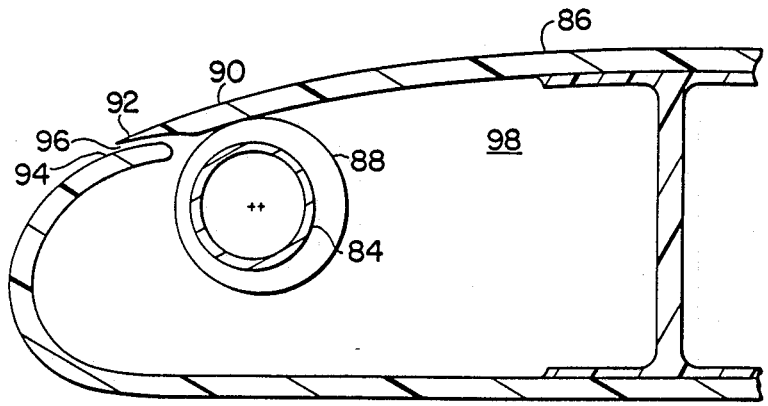
FIG. 6 is a partial cross-section of a circulation control rotor blade employing a tubular type of slot actuator.
Figure 7:
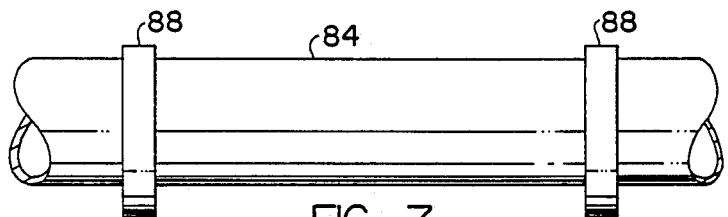
FIG. 7 is an axial section of the tubular slot actuator of FIG. 6.

Instead of the shaft and cam construction shown in FIGS. 4 and 5 for operating the flexible panels and adjusting slot opening, cylindrical tubes with appropriate camming surfaces may be used as shown in FIGS. 6 and 7. This construction provides direct cam action on the slot forming structure of the rotor blade. In FIG. 6, cylindrical tube 84 extends in a spanwise direction within the leading edge or trailing edge of the blade 86. There are a number of camming surfaces 88 located at predetermined intervals along the axis of the tube. This is shown in FIG. 7. The camming surfaces are in direct contact with flexible panel 90, FIG. 5, having lip surface 92 which together with Coanda surface 94 defines slot 96 for the discharge of pressure air from blade plenum 98. Rotation of the tube and the camming surface increases or decreases the area of slot 96 and the airflow over the Coanda surface.

Figure 8:
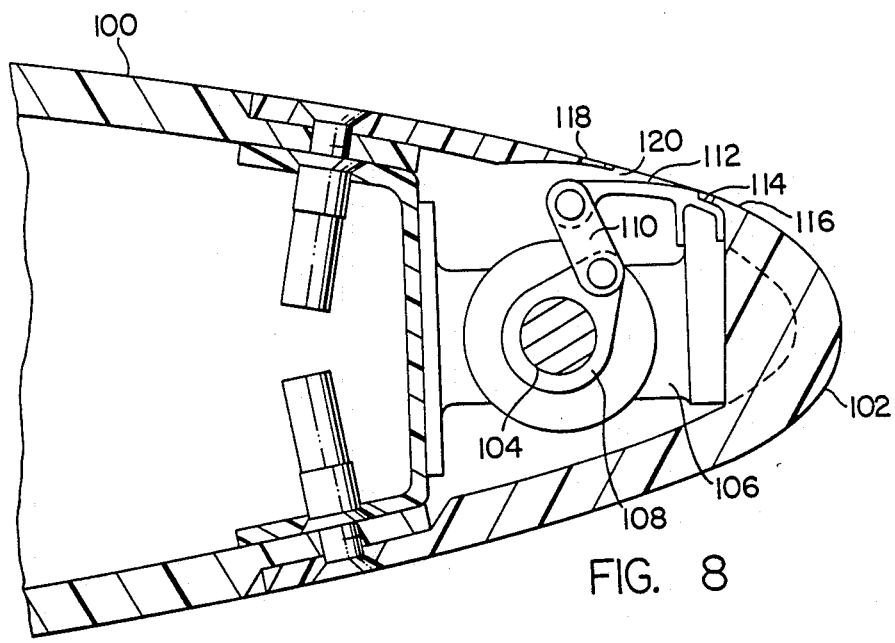
FIG. 8 is a showing of a cam/linkage type of slot control.

An alternative construction for slot control utilizing a rotatable shaft is shown in FIG. 8. Rotor blade 100 has edge portion 102 containing spanwise extending shaft 104. The shaft is connected at the root end of the blade to a rotary actuator such as actuator 52 in FIG. 3. The shaft is supported at intervals along the blade span as by bearing housing 106. A plurality of cams such as cam 108 are spaced along the length of the shaft. Each cam is connected by a link 110 to the inner edge of spanwise extending flexible panel 112. The outer edge of the panel is fixedly connected to rotor blade structure as at 114 adjacent Coanda surface 116 so that the top surface of the panel blends with the Coanda surface. Panel 112 together with lip 118 on the upper surface of the rotor blade define slot 120. The area of the slot is determined by the position of cams 108, and rotation of the cam raises or lowers the inner edge of the flexible panel 112 by bending the panel to decrease or increase slot area accordingly.

Figure 10:
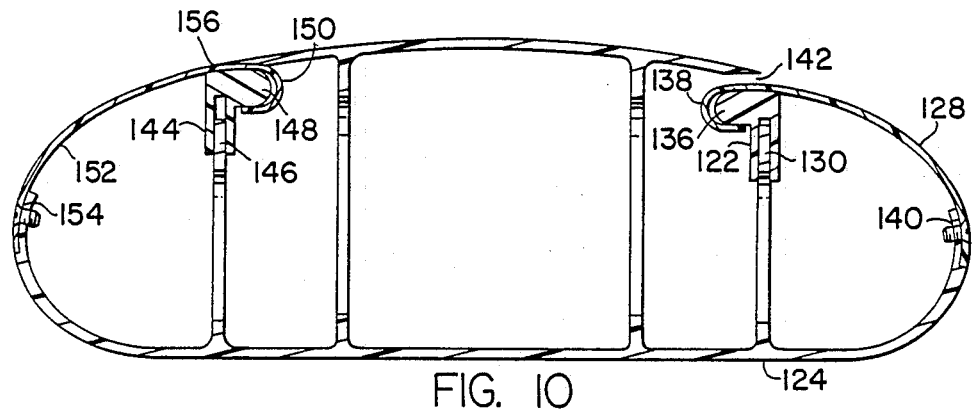
FIG. 10 is a cross-section of the rotor blade of FIG. 9.

A somewhat different construction for slot control is shown in FIGS. 9 and 10. The construction utilizes an inclined surface for varying the geometry of the slot. As shown in FIG. 9, driver strip 122, which extends spanwise of rotor blade 124, is subject to reciprocal spanwise motion in response to bleed control inputs from actuator 126 located in the root end of the rotor blade. The driver strip, through a camming-type action, raises or lowers the inner surface of flexible panel 128 to vary the area of the blade slot as required for airflow control. The driver strip is generally U-shape in form and rides on track 130 within the blade. The driver strip is secured to track 130 by a series of pins 132 which pass through cam-shaped apertures 134 in the track.

Centrifugal force will act to move the driver strip toward the blade tip. Thus, the structure always is in tension when operating, and since there is no reversal of loads, there is no deflection or hysteresis. Also, a lighter weight structure may be used. While resolution of the difference between centrifugal loads and air loads in any particular installation will determine which way is preferable, the cam-shaped apertures can be so shaped to cause the drive strip to rise under centrifugal loading or to descend. Cam-shaped apertures 134 as shown are arranged so that movement of the driver strip toward the tip of the rotor blade results in lowering of the strip and opening of the blade slots, and movement of the driver strip toward the root of the blade results in raising of the strip and closing of the blade slots.

FIG. 10 is a cross-section through rotor blade 124 of FIG. 9 and shows the blade slot in both an open and a closed position. At the right side of the blade, driver strip 122 is seen in position on track 130 which is part of the internal blade structure. The driver strip has head portion 136 which is generally surrounded by lip 138 on flexible panel 128. The panel is part of the edge surface of the rotor blade and is the Coanda surface. The other end of the flexible panel is rigidly secured to edge surface 140 of the blade. Spanwise movement of the driver strip, sliding along the track and within lip 138, will vary the position of the lip and the area of slot 142. In the position shown, the blade is open.

At the left side of the blade, driver strip 144 is seen in position on track 146. Head portion 148 on the driver strip is generally surrounded by lip 150 on flexible panel 152. The other end of the flexible panel is rigidly secured to edge surface 154 of the blade. In the position shown, slot 156 is closed.

With the blade construction of this invention, a generally constant air pressure potential is provided at all times within leading and trailing edge plenums, thus offering improved system reliability. A pressure relief arrangement may be provided at some location in the system, such as on the tip of a blade, to prevent an excessive pressure build-up.

Since the slots extend for a finite distance along the span of the blade, air pressure will tend to drop off in the direction of the blade tip direction when air is being discharged through the slot. This pressure loss can be compensated by suitable shaping the cam surfaces actuating the slot controlling flexible panels, such as 66, 90, 112, 128 and 152. This customizing of cam surfaces can provide uniform air distribution or any other distribution pattern in accordance with aerodynamic considerations. Also, variations in the cross-section area of the air plenum within a blade can be used to tailor airflow characteristics and air discharge through blade slots.

Figure 11:
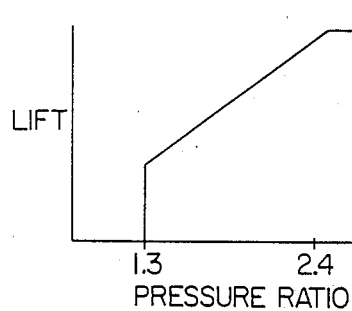
FIG. 11 is a lift vs. pressure ratio plot of prior art slot control systems.
Figure 12:
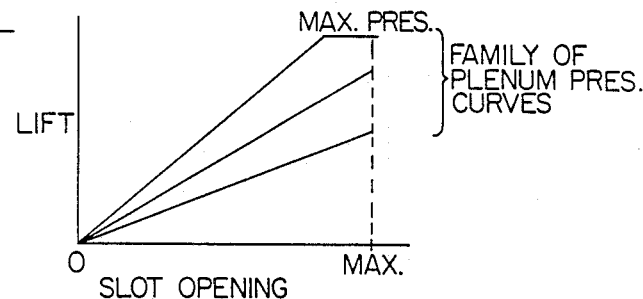
FIG. 12 is a lift vs. slot opening plot of the slot control system of the invention.

A major advantage relative to the system of the invention is the ability to control lift in the low lift region (virtually from zero) since the needed slot preload does not create an initial opening pressure deadband. Both the system of the invention and prior art systems have a slot preload to avoid undesired aerodynamic leading edge opening when blade external pressure decreases as speed and altitude increase. With the prior art systems, as shown in FIG. 11, the slots will open at a blade root control pressure level of approximately 1.3 atmospheres and exhibit control approximately proportional to flow to about 2.4 atmospheres. This dual function of the air slot opening and control results in a substantial lift immediately after the opening pressure level is exceeded. The direct control of slot opening via cam actuation, as shown in FIG. 12, permits independent control of slot position and air pressure/flow thereby providing for lift modulation virtually to zero.

It should be understood that the invention is not limited to the particular embodiments shown and described herein, but that various changes and modification may be made without departing from the spirit or scope of this concept as defined in the following claims.

We claim:

1. An aircraft utilizing a circulation control rotor system having a rotor drive shaft with rotor blades connected thereto, a rotor control system and a pneumatic system for supplying compressed air to said rotor blades including air storage means surrounding said rotor drive shaft means, said air storage means including a non-rotating chamber for receiving compressed air and a chamber rotating with said rotor drive shaft and rotor blades and from which compressed air is delivered to said rotor blades, each of said rotor blades including a variable slot along at least one edge of said blade, said slot consisting of a fixed surface and a flexible panel surface, track means extending longitudinally within said blade adjacent said flexible panel surface, driver means mounted on and slideable along said track means, means located in the root of said blade for imparting reciprocal sliding motion to said driver means in response to rotor control system inputs, connecting camming means between said track means and said driver means to cause said driver means to change elevation with respect to said track means during sliding motion, said flexible panel surface being slideably connected directly to said driver means so that changes in elevation of said driver means is imparted directly to said flexible panel surface to change slot area.

* * * * *